Figure 1:
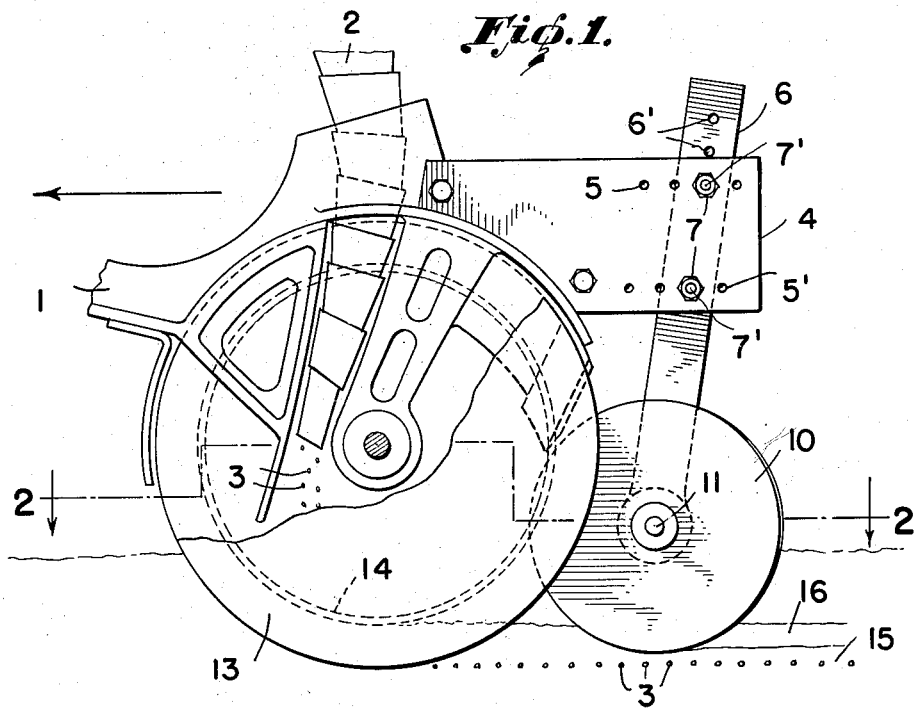

Dec. 11, 1951   P. E. LEMMON ET AL   2,577,775
COMBINATION OF ROTARY FURROWER AND PRESS WHEELS
Filed May 20, 1949

Inventors
P. E. LEMMON
A. J. JOHNSON

By  L. M. Mantell
ATTORNEYS

Patented Dec. 11, 1951

2,577,775

UNITED STATES PATENT OFFICE 2,577,775

COMBINATION OF ROTARY FURROWER AND PRESS WHEELS

Paul E. Lemmon and Arthur J. Johnson, San Fernando, Calif.

Application May 20, 1949, Serial No. 94,491
3 Claims. (Cl. 111—85)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to sub-surface press wheels for use with seed drilling equipment. It particularly relates to press wheels which follow within the furrow opening to press and squeeze moist, undisturbed soil over and around the seeds as they are dropped through the drill distribution tubes.

An object of this invention is to have the pressing take place before the soil has come to rest behind the furrow opener.

This permits fine, partially dry mulch from the surface to flow over the seeded and pressed rows to act as an insulator or blanket against further drying out and against subsequent glazing or crusting.

Our new type of press wheel, being attached closely behind the furrow opener, presses the fresh moist soil firmly against the newly planted seeds as the seeder passes, before the loose, partially-dry, surface mulch comes to rest behind the furrow opener and on the seeded row. The operation is classed as a sub-surface packing or pressing of the soil against the seeds.

The sub-surface press wheels cause a precision type of soil firming immediately around the seeds. This pressing or firming can be adjusted at will to meet requirements of different conditions. It is difficult to obtain sufficient firming or pressing action in some cases with conventional pressing means. Our press wheels are more effective because they localize the soil pressing action to make the results more effective in promoting conditions for immediate and optimum germination and development of seeds. Under some conditions conventional surface press wheels tend to glaze or slick the soil surface, which predisposes it to crusting. Crusting often results in a loss of many, if not all, seedlings because they are unable to break through and continue growth. The sub-surface press wheels allow fine mulch soil to flow over the surface which is pressed and thus eliminates crusting or slicking over.

The invention is directed to the principle of sub-surface packing or pressing of the soil around seeds as they are drilled and the use of rolling press wheels of any size, shape or form, used singly or in span and adjusted for any caster, toe-in or camber, as integral parts of the furrow openers, or as attachments thereto, to accomplish sub-surface packing or pressing of the soil around seeds as they are drilled.

It is also directed to the use of other devices in place of the rolling wheels, such as sliding shoes and runners, to accomplish the purpose of sub-surface packing or pressing of soil around seeds as they are drilled. It is also directed to sub-surface packing or pressing of the soil around seeds as they are drilled by any kind or type of furrow opener, such as double-disk openers, shown in the figures, single-disk openers, hoe openers, and shoe openers.

In one aspect, the apparatus comprises one or more rolling press wheels the axle, or axles, of which is attached to the frame of the furrow opener. The press wheels are preferably so mounted that a part of each wheel may be introduced inwardly or forwardly, to overlap the furrow opener disc; a part of the wheel extends rearwardly of the disc.

One embodiment is illustrated in the following drawing in which: Figure 1 is an elevation, and Figure 2 a section on line 2—2 of Figure 1.

The apparatus illustrated comprises a conventional frame 1 which drops seed 3 through tube 2 into the furrow. Rigidly attached to frame 1 is an attachment plate 4 having two parallel rows of holes 5 and 5' for adjustable and rigid attachment of suspending bar 6. Bolts 7' and nuts 7 fasten 6 to 4.

Figure 2:
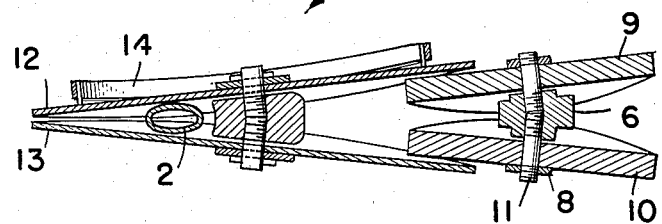

Bar 6 suspends the axle 11 of rolling press wheels 9 and 10, preferably with their lowest point higher than the lowest point of the furrow opening wheels or cutters 12 and 13. Each press wheel preferably comprises a rolling disc presenting a cylindrical periphery of substantially greater thickness than the furrow cutting wheels 12 and 13. Nuts 8 hold the wheels in place. As shown in Figure 2 the planes of the cutting wheels 12 and 13 tilt outwardly and upwardly, and are toed inwardly at their forward edges, in the usual way. The press wheels are likewise tilted outwardly; they may also be toed inwardly, as shown in Figure 2, to the same or more or less degree than cutting wheels 12 and 13.

The press wheels shown are seven inches in diameter and about one-half inch wide. Preferably, they are assembled on the axle 11 with approximately the same toe-in and tilt or camber as that of the disks of the furrow openers. However, this invention includes a wheel or wheels of other sizes and shapes, and assembled with other degrees of toe-in and camber. A band depth gauge commonly used for precision drilling is shown at 14. By means of adjustment holes 5 and 5' on plate 4 and holes 6' on connecting bar 6, the press wheels can be adjusted, up and down, with respect to the seed zone to obtain the proper total depth of seeding. A portion of seed coverage at 15 is made up of firmly pressed moist soil and the remaining portion 16 being made of fine mulch dry enough to act as an insulating blanket to prevent crusting. The adjustment holes 5 and 5' also permit wide angle adjustment of the bar 6, whereby the pressing rollers or wheels may be inserted between the cutter wheels as closely adjacent to the dropping seed as desired.

The sub-surface press wheel assembly 4, 6, 9, 10 may be attached to any of the common grain drills, for example, to the ordinary grain, beet, or bean drill openers. As shown in Figure 2, the ground-contacting, soil-packing surfaces of the press rollers 9 and 10 are closely adjacent, forming together a soil packing surface.

Having thus described our invention, we claim:

1. In a seed drill having a frame, and means for opening a furrow mounted thereby, comprising two rolling cutting plates toed-in toward each other at their forward edges and tilted away from each other at their upper edges, and tube means between said cutting plates for dropping seed; in combination therewith, a pair of press wheel rollers having ground-contacting, soil-packing surfaces mounted on the frame toward the rear of said cutting plates and tube, the press wheel rollers being toed-in toward each other forwardly and tilted away from each other at their upper edges, and being mounted so that their lowermost edges are higher than the lowermost cutting edge of the furrow opening cutting plates but below the upper edges of the furrow, and so that the forward edges of the press wheel rollers are within and over-lapped by the rearward edges of the cutting plates, the ground-contacting, soil-packing surfaces of the press wheel rollers being closely adjacent each other and being adjacent the cutting plates, the means for mounting the press wheel rollers upon the frame including means for adjusting the press wheel rollers toward and away from the cutting plates and the lower end of the tube means for dropping seed.

2. The apparatus defined in claim 1, and in which depth gauge means is provided for determining the depth of the furrow, the lowermost edges of the press wheels being lower than the depth gauge means.

3. In a seed drill having a frame, and means for opening a furrow mounted thereby, comprising two rolling cutting plates toed-in toward each other at their forward edges, and tube means between said cutting plates for dropping seed; in combination therewith a pair of press wheel rollers having ground-contacting, soil-packing surfaces mounted on the frame toward the rear of said cutting plates and tube, the press wheel rollers being toed-in toward each other forwardly and tilted away from each other at their upper edges, and being mounted so that their lowermost edges are higher than the lowermost cutting edges of the furrow opening cutting plates but below the upper edges of the furrow, and so that the forward edges of the press wheel rollers are within and over-lapped by the rearward edges of the cutting plates, the ground-contacting, soil-packing surfaces of the press wheel rollers being closely adjacent each other and being adjacent the cutting plates, the means for mounting the press wheel rollers upon the frame including means for adjusting the press wheel rollers toward and away from the cutting plates and the lower end of the tube means for dropping seed, and in which depth gauge means is carried by the cutting plates to limit the depth of the furrow, the lowermost edges of the press wheels being lower than the depth gauge means.

PAUL E. LEMMON.
ARTHUR J. JOHNSON.

REFERENCES CITED

The following references are of record in the file of this patent:

UNITED STATES PATENTS

| Number | Name | Date |
| --- | --- | --- |
| 345,403 | Arnett | July 13, 1886 |
| 558,849 | Schell | Apr. 21, 1896 |
| 736,369 | Dynes et al. | Aug. 18, 1903 |
| 860,416 | Sparks | July 16, 1907 |
| 939,812 | Davis | Nov. 9, 1909 |
| 1,149,992 | Brennan | Aug. 10, 1915 |
| 1,787,538 | Le Boeuf et al. | Jan. 6, 1931 |
| 2,155,443 | Parks et al. | Apr. 25, 1939 |
| 2,304,376 | Ramsey | Dec. 8, 1942 |

FOREIGN PATENTS

| Number | Country | Date |
| --- | --- | --- |
| 454,387 | Great Britain | Sept. 30, 1936 |